UNITED STATES PATENT OFFICE.

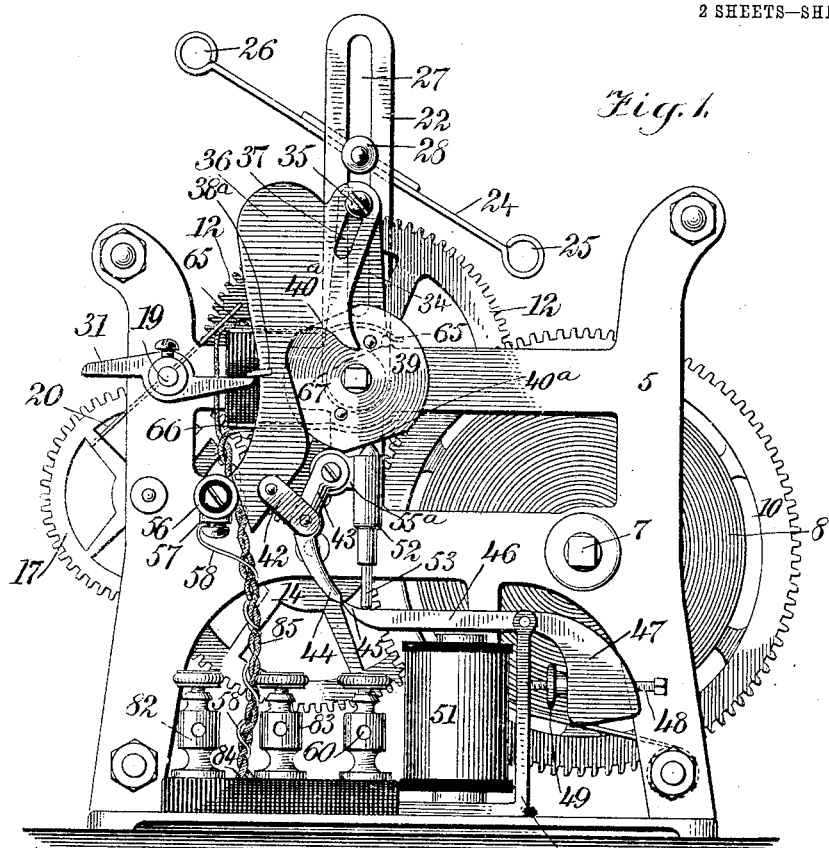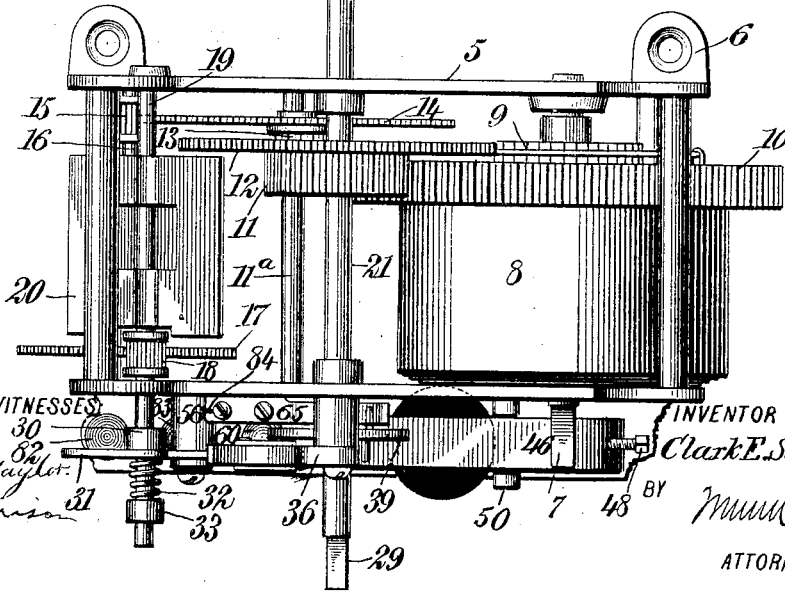

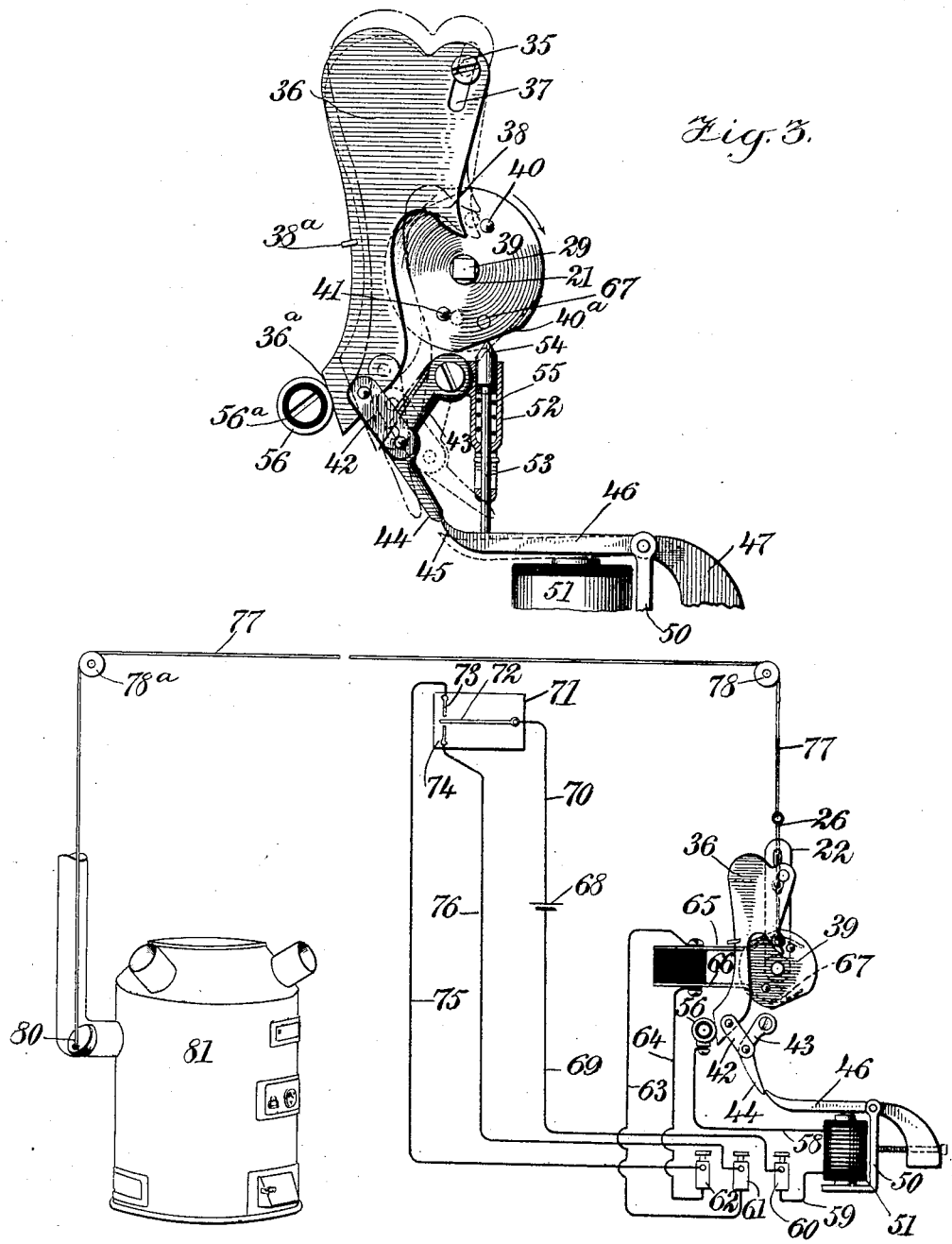

CLARK E. SANFORD, OF OSWEGO, NEW YORK.

AUTOMATIC DAMPER AND VALVE REGULATOR.

No. 805,159.　　　　Specification of Letters Patent.　　　　Patented Nov. 21, 1905.

Application filed September 21, 1904. Renewed October 9, 1905. Serial No. 282,053.

*To all whom it may concern:*

Be it known that I, CLARK E. SANFORD, a citizen of the United States, and a resident of Oswego, in the county of Oswego and State of New York, have invented a new and Improved Automatic Damper and Valve Regulator, of which the following is a full, clear, and exact description.

My invention relates to automatic damper and valve regulators, and admits of general use, but is of peculiar value in cases where the mechanism is desired to be simple and reliable, and more particularly where the apparatus is provided with electric circuits in which it is desirable to prevent the circuits from being closed by any means so as to remain closed, battery energy being thus conserved.

My invention further relates to certain details of construction and arrangements and combinations of parts hereinafter described, illustrated in the accompanying drawings, and defined in the appended claims.

Reference is to be had to the accompanying drawings, forming a part of this specification, in which similar characters of reference indicate corresponding parts in all the figures.

Figure 1 is a side elevation of the motor and contact mechanism which is preferably embodied in a single instrument, as shown. Fig. 2 is plan view of the same. Fig. 3 is a fragmentary elevation of the mechanism used for automatically opening the circuit, and Fig. 4 is a diagram of the wiring and contact mechanism.

The framework is shown at 5 and is provided with ears 6, whereby it may be securely fastened upon a shelf or other support. A winding-stem 7 is connected with a spring 8 and with ratchet mechanism 9, mounted upon a spur-gear 10 in the manner well known in clocks and motors, whereby the spring 8 is wound up by means of the stem 7 and causes the revolution of the spur-gear 10. This gear meshes with a pinion 11, rigidly connected with a gear 12, which in turn meshes with a pinion 13. This pinion, together with a gear 14, is rigidly mounted upon a revoluble shaft $11^a$. The gear 14 meshes with a lantern-wheel 15, mounted upon a revoluble shaft 16, which extends entirely across the frame and is provided upon its opposite end with a gear 17. This gear meshes with a lantern-wheel 18, rigidly mounted upon a revoluble shaft 19, and also mounted upon this shaft is a paddle-wheel or fan 20, which prevents excessive rapidity of motion of the several parts and incidentally serves to remove the loose dust which may settle among the working parts. The pinion 11 and the gear 12 are rigidly mounted upon a main shaft 21, which is provided at one of its ends with a crank 22, upon which is slidably mounted a bearing 23. This bearing is provided with an eye-bar 24, provided with upper and lower eyes 26 25, as will be understood from Figs. 1 and 2. Normally the eye-bar is vertical, but in the figures is turned at an angle for the purpose of illustration. A fastening 28, slidable in a slot 27 in the crank 22, is used to adjust the bearing 23 relatively to the crank 22, so that the bearing, which forms a pivotal support for the eye-bar, may be moved toward or from the main shaft 21, thus giving the bearing 23 any desired degree of movement around the shaft 21, considered as a center. The shaft 21 is also provided with an angular head 29, the purpose of which is to form a mounting for another crank to be used for operating any other machinery dependent upon the motions of the shaft 21.

Mounted rigidly upon the shaft 19 is a set-collar 30, and pressed against this collar by means of a spiral spring 32 is a compound stop-lever 31. Another set-collar 33, mounted upon the shaft 19, serves as a buffer for the spring 32, so that the pressure of this spring holds the stop-lever 31 comparatively rigid upon the shaft 19, and yet by a little effort the stop-lever may be turned relatively to the shaft. A link 36 is provided with a slot 37, in which loosely engages a screw 35, mounted upon a standard 34, integral with the framework 5. This link is provided with a tongue 38, preferably integral therewith, and also with a detent $38^a$ and a flat contact-surface $36^a$.

Mounted upon the shaft 21 at a point immediately adjacent to the link 36 is a revoluble disk 39, provided with lifting-pins 40 and 41. These pins are adapted to engage the tongue 38 successively, thereby raising the link 36, as indicated by dotted lines in Fig. 3. The disk 39 is provided upon its periphery with oppositely-disposed facets $40^a$, as shown more particularly in Fig. 1.

A comparatively small link 42 is pivotally connected with a lever 43, provided with a beveled end 44, which engages the point 45 of an armature 46. This armature is provided with a weighted end 47, whereby it is normally maintained in the position indicated by full lines in Fig. 3. An adjusting-screw 48 passes through the weighted end 47 and is provided with a locking-nut 49, whereby it may be secured in different positions. The adjusting-screw 48 engages a standard 50, mounted upon the framework, and upon this standard is mounted the armature 46. A magnet 51 is disposed immediately below the armature 46 and is adapted to draw the same downward.

A sleeve 52, supported by a bracket 55ª on the framework, is provided with a plunger 53, having a beveled head 54 and yieldingly supported relatively to the sleeve by means of a spiral spring 55. The pressure of the spring 55 tends normally to maintain the plunger 53 in its uppermost position, as indicated by full lines in Fig. 3. This position can be occupied by the plunger only when one or the other of the facets 40ª engages the beveled head 54, for the reason that the disk 39 depresses the plunger except when the disk is in such position that the facets mentioned engage the beveled head 54.

A cylindrical contact member 56, insulated by means of a sleeve 56ª, of hard rubber or other insulating material, is mounted upon the framework and is provided with a binding-screw 57, as indicated in Fig. 1. From this binding-screw a wire 58 leads downward to the magnet 51. From this magnet a wire 59 leads to a binding-post 60, located near the base of the framework and insulated therefrom. Two other binding-posts 61 62 are disposed adjacent to the binding-post 60. From the binding-posts 61 62 wires 63 64 lead upward and are electrically connected with spring contact members 65 66, which are adapted to be engaged successively by a single contact-pin 67, mounted upon the revoluble disk 39. The battery is shown at 68 (see Fig. 4) and is connected by a wire 69 with the binding-post 60. A wire 70 connects the battery with a thermostat 71, which may be of any desired construction, but preferably comprises a contact-tongue 72, to be curved in opposite directions by heat and cold, and contact members 73 74, disposed on opposite sides of this tongue, to be engaged thereby. Wires 75 76 connect the contact members 73 74 with the binding-posts 62 61. A cord 77 is connected with the eye 26 of the eye-bar 27, the eye 25 being provided for the purpose of suspending a counterweight thereto in the usual manner. This flexible connection runs over pulleys 78 78ª and is secured to a damper 80 upon a furnace 81, this part of the construction being old and well known and admitting of endless variation according to the needs of the apparatus.

The operation of my device is as follows: A key being applied to the winding-stem 7, the coil-spring 8 is wound up and tends to turn the train of gearing above described. The link 36 normally occupies the position indicated in Fig. 3. The beveled end 44 of the lever 43 is now lodged against the point 45 of the armature 46, and the latter occupies its normal or uppermost position. (Indicated in Fig. 3.) We will assume that the damper 80 is open, so that the furnace 81 is cooling off, also that the tongue 72 of the thermostat is out of engagement with the contact members 73 74 and because of the lowering temperature is moving toward the contact member 73. The temperature being lowered to a predetermined degree, the tongue 72 makes contact with the contact member 73, completing the following circuit: battery 68, wire 70, contact-tongue 72, contact member 73, wire 75, binding-post 62, wire 64, spring-contact 66, contact-pin 67, disk 39 through the metallic framework 5, thence through the link 36, contact member 56, wire 58, magnet 51, wire 59, binding-post 60, and wire 69 back to the battery 68. This energizes the magnet 51, and thereby causes the armature 46 to be depressed. The lever 43 is now released and the link 36 drops downward by its own weight, so that contact is broken between the contact-face 36ª and the contact-sleeve 56. The link 36 drops to an extent commensurate with the position of the upper end of the slot 37 and swings slightly to the right to the position indicated by dotted lines in Fig. 3. In doing this the detent 38ª releases the stop-lever 31, which normally restrains the motor mechanism from running—that is to say, the stop-lever 31 being mounted upon the revoluble shaft 19 and being unable to turn because lodged against the detent 38ª holds the motor mechanism at a standstill until the magnet is energized, allowing the link 36 to move downwardly and to the right, as indicated by dotted lines in Fig. 3. The motor mechanism is thus started up and moves to a degree commensurate with a one-half revolution of the main shaft 21. This leaves the crank 22 in the position exactly opposite from that which it occupied before. The result is that each time the magnet 51 is energized the crank 22 makes a half-revolution, thus closing the damper 80 or opening the same, according to the position occupied by the crank 22 at the moment it stops. The disk 39 being upon the same shaft as the crank 22 also makes a half-revolution, so that the contact-pin 67 breaks its engagement with the contact-spring 66 and makes engagement with the contact-spring 65. Because of this movement of the single contact-pin 67 the circuit is no longer to be completed through the contact-spring 66 and the wire 64, no matter what may be the position of the tongue 72. If, therefore, this tongue remains in contact with the contact member 73, the battery-current is not wasted nor is any part affected nor is any mechanism allowed to move for the time being. If, however, by the position of the damper 80 affecting the temperature in any desired manner the contact-tongue curves in the opposite direction, so as to engage the contact member 74, the following circuit is completed: battery 68, wire 70, contact-tongue 72, contact member 74, wire 76, binding-post 61, wire 63, spring-contact member 65, contact-pin 67, (which would now be in its uppermost position, owing to the half-revolution made by the disk 39,) framework 5, link 36, contact member 56, wire 58, magnet 51, wire 59, binding-post 60, wire 69, back to battery 68. This circuit energizes the magnet 51, draws down the armature 46, again releases the link 36 from its position indicated by full lines in Fig. 3 to its position indicated by dotted lines in said figure, and by withdrawing the detent 38ª from its engagement with the stop-lever 31 again starts up the motor mechanism, which makes another half-revolution of the main shaft 21. The net result is that if the room containing the thermostat becomes cool the thermostat closes the circuit which controls the opening of the damper, and the circuit is then left open. If now the room becomes warm, the thermostat closes a different circuit, which controls the closing of the damper, and after the damper is closed the circuit is left open, as before. In all cases the circuit is left open immediately after the thermostat does its work in controlling the damper.

The purpose of arranging the disk 39 and facets 40ª so as to hold the plunger 53 in its lowermost position while the shaft 21 is making its half-revolution is as follows: The circuit through the magnet 51 is only closed momentarily and is opened again within a fraction of a second afterward, the opening taking place long before the half-revolution is completed. Toward the close of this half-revolution the one or the other of the lifting-pins 40 and 41 engages the tongue 38, and thus raises the link 36 into its uppermost position (indicated by full lines in Fig. 3) and brings the contact-face 36ª against the contact-sleeve 56. There is a time during each half-revolution of the shaft 21 when neither contact-spring 65 nor 66 is engaged by the pin 67 and both circuits through the contact-springs 65 66 are open. During this time were it not for the plunger 53 some one might either through accident or for mischief push the link 36 to the left, in which position it would be held by the point 44 resting against the point 45. This would stop the machine by causing the tongue 38ª to hold the lever 31, and the next successive reversal of temperature would not complete a circuit. The trouble could be righted by depressing the armature 46 by hand. Again, were it not for the plunger 53 mischievous persons might grasp the handle 22 and after pushing down the armature 46 turn the motor violently backward until it reaches a point where it catches and even where it leaves the circuit open. The plunger 53 is for preventing such mischievous pranks and also for preventing accidental derangement of the apparatus. Owing to the action of the plunger 53, the armature is held down except when the facets 40 allow it to rise, and when the armature is thus held down the point 44 can never lodge against the point 45, so as to hold the link 36 to the left. This is done by the positive pressure of the plunger 53. If for any reason there should be a tendency for the armature 46 to move into its uppermost position by mischievous manipulation while the shaft 21 is in motion, the plunger 53 prevents the point 45 from interfering in the slightest degree with the movements of the lever 43 or of the link 36. The path of the lever 43 and especially of the point of the beveled end 44 is therefore entirely free in so far as obstruction by the point 45 is concerned. If for any reason there should be a false circuit formed through the magnet 51, (the circuit temporarily passing through the frame or otherwise)—as, for instance, by unauthorized persons tampering with the apparatus or by disarrangement of the circuits, so that the magnet 51 is energized improperly— even then then the battery power is not wasted, though the motor mechanism might be run down—that is to say, there might be a succession of momentary circuits made by the engagement of the contact-face 36ª and the sleeve 56; but these momentary circuits would not materially waste the battery, and even when the motor mechanism ran down completely the circuit would finally be left open. Also if a chain should catch or a key be accidentally left in, so as to stop the motor, the circuit would be left open. If the armature 46 should be held down continuously by undesirable means, as by a weight dropping upon it accidentally, the lever 43 would move to the right a little in the same manner as if released by the magnet 51, and the motor mechanism would begin to run. Instead of stopping at a completion of a half-revolution of the shaft 21 the motor mechanism would run continuously until it ran down. In this event the last thing it would do would be to leave the circuit open, for the reason that the link 36 could not stop when in engagement with the contact-sleeve 56, and even if it did the position of the contact-pin 67 would necessarily be such that the circuit would be open. While, therefore, with the apparatus it might be possible, owing to accident, for the motor mechanism to run down, it would be impossible for the battery to be wasted. I have found that it is desirable to have the contact-face 36ª in moving into engagement with the contact-sleeve 56 to move directly toward the same instead of moving toward the same by a shearing motion. The arrangement of the slot 37, screw 35, and link 42 is such that the contact-face 36ª when it moves into engagement with the sleeve 56 follows a sort of parallel motion, and thus moves into engagement directly and squarely. The sparking is thus reduced to a minimum, and the necessity for using platinium is thus obviated.

Having thus described my invention, I claim as new and desire to secure by Letters Patent—

1. The combination of a thermostat, normally open electric circuits connected therewith, a source of electricity for periodically energizing said circuits, contact-springs connected with said circuits, a revoluble member provided with a contact-pin for engaging said contact-springs one at a time, a link connected with said revoluble member and adapted to be actuated by movements thereof, said link being provided with a contact-face, a contact-sleeve connected with said circuits and adapted to be engaged by said contact-face of said link for the purpose of completing said circuits, mechanism connected with said contact-link for shifting the position thereof, thereby breaking said circuits, motor mechanism controllable by said circuits for opening and closing a damper, magnetic mechanism included within said circuits and connected with said motor mechanism for stopping and starting the same, and the thermostat connected with said electric circuits and provided with contact mechanism for controlling the same.

2. In an automatic damper and valve regulator, the combination of a link provided with a contact-face, a contact member to be engaged by said contact-face, a revoluble member provided with lifting-pins for shifting the position of said link, said revoluble member being further provided with facets, a spring-pressed plunger provided with a head adapted to be engaged by said facets, an armature engaged by said plunger and held positively thereby in certain predetermined positions, a magnet for attracting said armature, mechanism connecting said armature with said link, electric-motor mechanism controllable by the engagement and disengagement of said contact-face and said contact member, damper mechanism controllable by said electric mechanism, an electric circuit for energizing said magnet, and a thermostat for controlling said electric circuit.

3. In an automatic damper and valve regulator, the combination of a damper, motor mechanism for actuating the same, said motor mechanism being provided with a revoluble flattened disk, an electric circuit for controlling said motor mechanism, a magnetic member provided with an armature for stopping and starting said motor mechanism, and a plunger movable endwise and provided with a portion to be pressed upon by said flattened disk, said plunger being also provided with a portion for engaging said armature so as to temporarily prevent the same from interfering with said motor mechanism except at predetermined times.

4. In an automatic damper and valve regulator, the combination of a damper, motor mechanism for actuating the same, said motor mechanism being provided with a revoluble member, a movable link adapted to be engaged by said revoluble member, said movable link being provided with a contact-face, a contact-sleeve to be engaged by said contact-face for the purpose of closing an electric circuit, a magnetic member to be energized by said electric circuit, said magnetic member being provided with a movable armature, said armature being provided with means for shifting the position of said link, a tongue mounted upon said link, a stop-lever mounted upon said revoluble member of said motor mechanism and adapted to engage said tongue, and heat-controlled mechanism connected electrically with said circuit for the purpose of energizing said magnetic member.

5. In a device of the character described, the combination of a damper, motor mechanism for actuating the same, an electric circuit for controlling said motor mechanism, said electric circuit including a contact-sleeve, a movable link provided with a contact-face for engaging said contact-sleeve, and means for shifting the position of said link, and guide mechanism for causing said contact-face to move abruptly away from said contact-sleeve when the position of said link is thus shifted.

In testimony whereof I have signed my name to this specification in the presence of two subscribing witnesses.

CLARK E. SANFORD.

Witnesses:
   Jas. W. Sutton,
   Joseph H. Gill.